(12) United States Patent
Wardle

(10) Patent No.: US 10,851,907 B2
(45) Date of Patent: Dec. 1, 2020

(54) SYSTEM AND METHODS FOR AN ELECTROMAGNETIC ACTUATOR

(71) Applicant: HUSCO AUTOMOTIVE HOLDINGS LLC, Waukesha, WI (US)

(72) Inventor: Dean Wardle, Oconomowoc, WI (US)

(73) Assignee: HUSCO Automotive Holdings LLC, Waukesha, WI (US)

( * ) Notice: Subject to any disclaimer, the term of this patent is extended or adjusted under 35 U.S.C. 154(b) by 173 days.

(21) Appl. No.: 15/346,448

(22) Filed: Nov. 8, 2016

(65) Prior Publication Data

US 2017/0130858 A1    May 11, 2017

Related U.S. Application Data

(60) Provisional application No. 62/252,675, filed on Nov. 9, 2015.

(51) Int. Cl.
*F16K 31/06* (2006.01)
*F16K 31/08* (2006.01)
(Continued)

(52) U.S. Cl.
CPC ...... *F16K 31/0658* (2013.01); *F16K 31/0675* (2013.01); *F16K 31/082* (2013.01);
(Continued)

(58) Field of Classification Search
CPC .......... H01F 7/081; H01F 7/085; H01F 7/086; H01F 7/13; H01F 7/1607; H01F 7/1615;
(Continued)

(56) References Cited

U.S. PATENT DOCUMENTS 4,046,244 A    9/1977    Velazquez
4,072,918 A    2/1978    Read, Jr.
(Continued)

FOREIGN PATENT DOCUMENTS

CN    2577419 Y    10/2003
DE    10240774 A1    4/2003
(Continued)

OTHER PUBLICATIONS

European Patent Office, Extended European Search Report, Application No. 16197799.6, dated Mar. 23, 2017.
(Continued)

*Primary Examiner* — Jessica Cahill
*Assistant Examiner* — Patrick C Williams
(74) *Attorney, Agent, or Firm* — Quarles & Brady LLP

(57) ABSTRACT

An electromagnetic actuator having an actuating permanent magnet and a simplified construction is provided. The electromagnetic actuator includes a housing having a base, a side wall extending from the base to a termination plane, and a substantially open side. The electromagnetic actuator further includes a pole piece arranged within the housing, a wire coil positioned around the pole piece and arranged within the housing, and a permanent magnet coupled to the pole piece by a spring and moveable between a first position and a second position. An actuation position of the permanent magnet between the first position and the second position is proportional to a magnitude of a current applied to the wire coil.

20 Claims, 7 Drawing Sheets

(51) Int. Cl.
*H01F 7/16* (2006.01)
*H01F 7/08* (2006.01)
(52) U.S. Cl.
CPC .......... *H01F 7/081* (2013.01); *H01F 7/1646*
(2013.01); *H01F 2007/086* (2013.01)
(58) Field of Classification Search
CPC .. H01F 7/1638; H01F 7/1646; F16K 31/0658;
F16K 31/0675; F16K 31/0688
USPC .............................................. 251/65, 129.16
See application file for complete search history.

(56) References Cited

U.S. PATENT DOCUMENTS

| | | | | |
|---|---|---|---|---|
| 4,690,371 | A | * | 9/1987 | Bosley ................. F16K 31/082 |
| | | | | 251/129.01 |
| 4,783,051 | A | | 11/1988 | Gibas |
| 4,928,028 | A | * | 5/1990 | Leibovich ............ H01F 7/1646 |
| | | | | 310/23 |
| 4,994,776 | A | | 2/1991 | Juncu |
| 5,010,911 | A | | 4/1991 | Grant |
| 5,161,779 | A | * | 11/1992 | Graner ................. H01F 7/1646 |
| | | | | 251/129.15 |
| 5,272,458 | A | | 12/1993 | Hoffman et al. |
| 5,547,165 | A | * | 8/1996 | Brehm ................ F16H 61/0251 |
| | | | | 251/129.08 |
| 5,611,370 | A | * | 3/1997 | Najmolhoda ....... F16K 31/0613 |
| | | | | 137/625.61 |
| 6,040,752 | A | | 3/2000 | Fisher |
| 6,198,369 | B1 | * | 3/2001 | Ward .................... F02M 59/466 |
| | | | | 335/220 |
| 6,414,577 | B1 | * | 7/2002 | Hoffman ................ H01F 7/122 |
| | | | | 335/229 |
| 6,639,496 | B1 | | 10/2003 | van Namen |
| 6,729,277 | B2 | | 5/2004 | Yamaki et al. |
| 6,950,000 | B1 | | 9/2005 | Lanni et al. |
| 6,967,550 | B2 | | 11/2005 | Elendt et al. |
| 7,097,150 | B2 | * | 8/2006 | Sedda ....................... F01L 9/04 |
| | | | | 251/129.01 |
| 7,219,698 | B2 | * | 5/2007 | Mayer ..................... B01D 53/90 |
| | | | | 137/605 |
| 8,176,887 | B2 | | 5/2012 | Golz et al. |
| 8,203,405 | B2 | | 6/2012 | Golz et al. |
| 2005/0006611 | A1 | * | 1/2005 | Choi ................... F16K 31/0655 |
| | | | | 251/65 |
| 2005/0052265 | A1 | | 3/2005 | Vladimirescu et al. |
| 2005/0230649 | A1 | * | 10/2005 | Scheibe ................ F16K 31/082 |
| | | | | 251/129.16 |
| 2007/0035371 | A1 | | 2/2007 | Yamasaki et al. |
| 2007/0194872 | A1 | | 8/2007 | Pfister et al. |
| 2008/0079521 | A1 | | 4/2008 | Maerky et al. |
| 2008/0204175 | A1 | | 8/2008 | Barabas-Lammert |
| 2008/0245983 | A1 | | 10/2008 | Hoppe et al. |
| 2008/0276889 | A1 | | 11/2008 | Sfaxi et al. |
| 2009/0200502 | A1 | | 8/2009 | Hoppe et al. |
| 2010/0025606 | A1 | | 2/2010 | Hoppe |
| 2010/0163128 | A1 | | 7/2010 | Kinscher et al. |
| 2010/0271157 | A1 | | 10/2010 | Talon |
| 2011/0001591 | A1 | | 1/2011 | Puth et al. |
| 2011/0012041 | A1 | * | 1/2011 | De Santis ........... F16K 31/0675 |
| | | | | 251/129.15 |
| 2011/0121218 | A1 | | 5/2011 | Hoppe et al. |
| 2011/0204269 | A1 | | 8/2011 | Hoppe et al. |
| 2011/0220826 | A1 | | 9/2011 | Hoppe et al. |
| 2011/0248804 | A1 | | 10/2011 | Wygnanski |
| 2011/0285484 | A1 | | 11/2011 | Hoppe et al. |
| 2012/0312262 | A1 | | 12/2012 | Hoppe et al. |
| 2015/0322830 | A1 | | 11/2015 | Rigling |

FOREIGN PATENT DOCUMENTS

| | | |
|---|---|---|
| DE | 102006034922 A1 | 1/2008 |
| DE | 102009006061 A1 | 7/2010 |
| DE | 102013206976 A1 | 10/2014 |
| EP | 0380693 A | 8/1990 |
| EP | 2993674 A1 | 9/2016 |
| GB | 2243488 A | 10/1991 |
| JP | S4947873 A | 5/1974 |
| JP | S59170581 A | 9/1984 |
| JP | H01302707 A | 12/1989 |
| JP | 2003148647 A | 5/2003 |

OTHER PUBLICATIONS

Extended European Search Report; Appln. 16197805.11566; dated Jun. 13, 2017; 12 pages.
European Patent Office, Examination Report for application 16197799.6, dated Jul. 11, 2019, 7 pages.

* cited by examiner

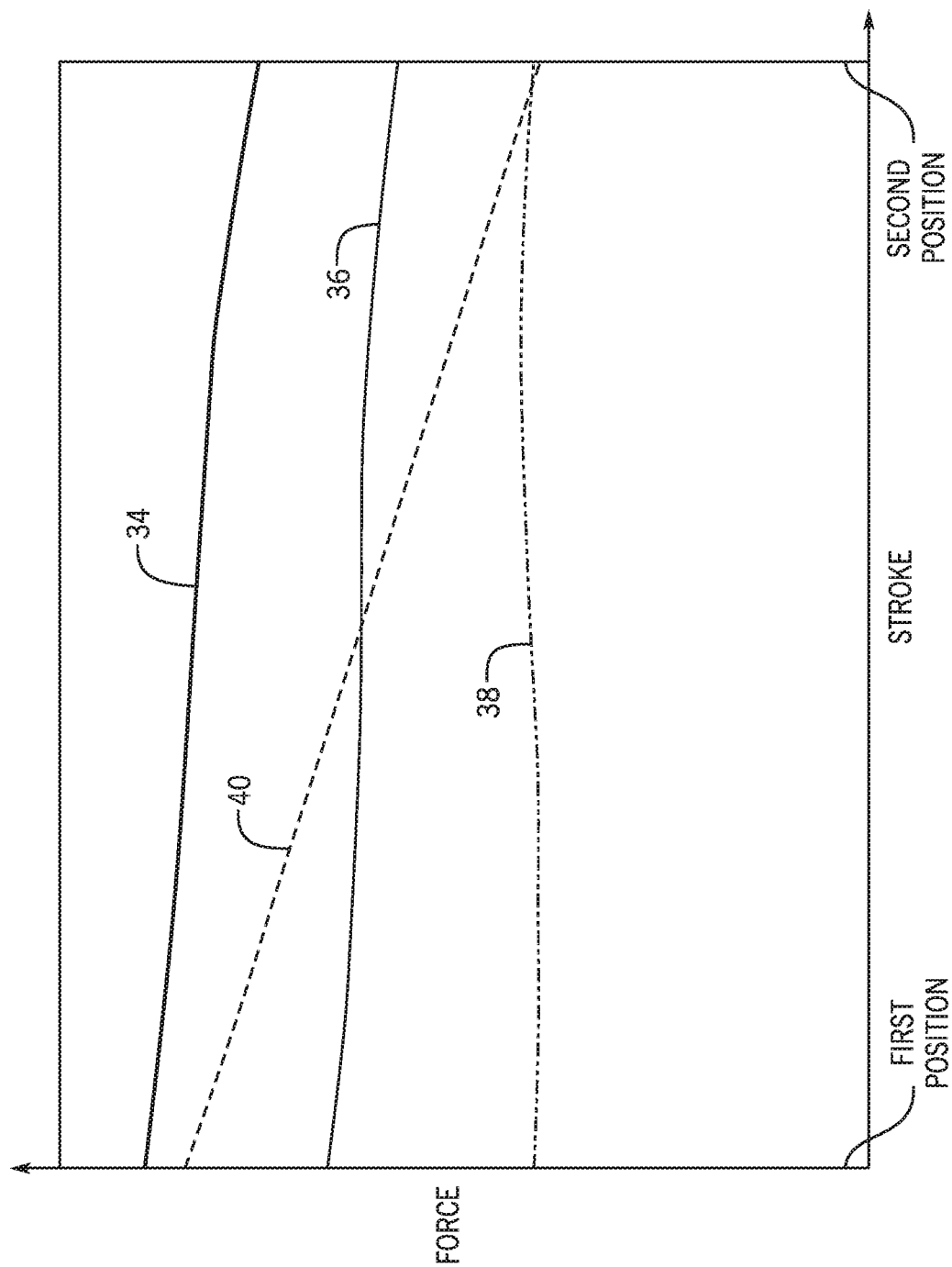

SYSTEM AND METHODS FOR AN ELECTROMAGNETIC ACTUATOR

CROSS-REFERENCES TO RELATED APPLICATIONS

The present application is based on, claims priority to, and incorporates herein by reference in its entirety, U.S. Provisional Patent Application No. 62/252,675, filed Nov. 9, 2015, and entitled "Systems and Methods for an Electromagnetic Actuator."

STATEMENT REGARDING FEDERALLY SPONSORED RESEARCH

Not Applicable.

BACKGROUND

The present disclosure relates generally to an electromagnetic actuator and, more specifically, to an electromagnetic actuator having a simplified design utilizing an a permanent magnet.

Electromagnetic actuators (e.g., a solenoid) typically include a wire coil positioned within a housing and around a moveable armature. A current can be applied to the wire coil to produce a magnetic field which can then actuate (i.e., move) the moveable armature with respect to the housing. Current trends are leading towards reducing the size of electromagnetic actuators. However, reducing the size of electromagnetic actuators can require a reduction in air gaps between the armature and other magnetic components within the housing (e.g., the wire coil). A reduction in the air gaps within an electromagnetic actuator can extremely tighten the tolerances and clearances, which, for manufacturing purposes, can prohibitively increase costs. Additionally, a reduction in the air gaps can lead to high side loading forces (i.e., forces substantially perpendicular to the desired direction of actuation) if the armature is not kept fully centered.

Furthermore, reducing the size of electromagnetic actuators can increase the magnetic flux carried through the magnetic components of the electromagnetic actuator. An increase in the magnetic flux carried through the magnetic components of the electromagnetic actuator can require that the flux carrying components (i.e., magnetic components) be made thicker, or define a larger cross-sectional area, to prevent magnetic saturation. Increasing the cross-sectional area of the flux carrying components can lead to added cost due to additional material, and also requires more space, which offsets the goal of making the electromagnetic actuator smaller.

SUMMARY OF THE INVENTION

The present invention provides systems and method for an electromagnetic actuator. The electromagnetic actuator includes an actuatable permanent magnet and a simplified construction. Utilizing the actuatable permanent magnet lowers the overall magnetic flux levels throughout the electromagnetic actuator and prevents magnetic saturation, which enables the electromagnetic actuator to be constructed using smaller, thinner, and/or lighter components.

In one aspect, the present invention provides an electromagnetic actuator including a housing having a base, a side wall extending from the base to a termination plane, and a substantially open side. The electromagnetic actuator further includes a pole piece arranged within the housing a wire coil positioned around the pole piece and arranged within the housing, and a permanent magnet moveable between a first position and a second position. An actuation position of the permanent magnet between the first position and the second position is proportional to a magnitude of a current applied to the wire coil.

In another aspect, the present invention provides a control valve including an electromagnetic actuator. The electromagnetic actuator includes a housing having a base, a side wall extending from the base to a termination plane, and a substantially open side. The electromagnetic actuator further includes a pole piece arranged within the housing a wire coil positioned around the pole piece and arranged within the housing, and a permanent magnet moveable between a first position and a second position. An actuation position of the permanent magnet between the first position and the second position is proportional to a magnitude of a current applied to the wire coil. The control valve further includes a valve body including at least one work port, and a valve spool slidably received within the valve body and coupled to the permanent magnet for actuation therewith.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DESCRIPTION OF DRAWINGS

The invention will be better understood and features, aspects and advantages other than those set forth above will become apparent when consideration is given to the following detailed description thereof. Such detailed description makes reference to the following drawings.

FIG. 5 is a graph illustrating an attraction force acting on a permanent magnet of the electromagnetic actuator and a spring force acting on the permanent magnet as a function of a position, or stroke, of the permanent magnet in accordance with one embodiment of the present invention.

DETAILED DESCRIPTION OF THE INVENTION

Figure 1:
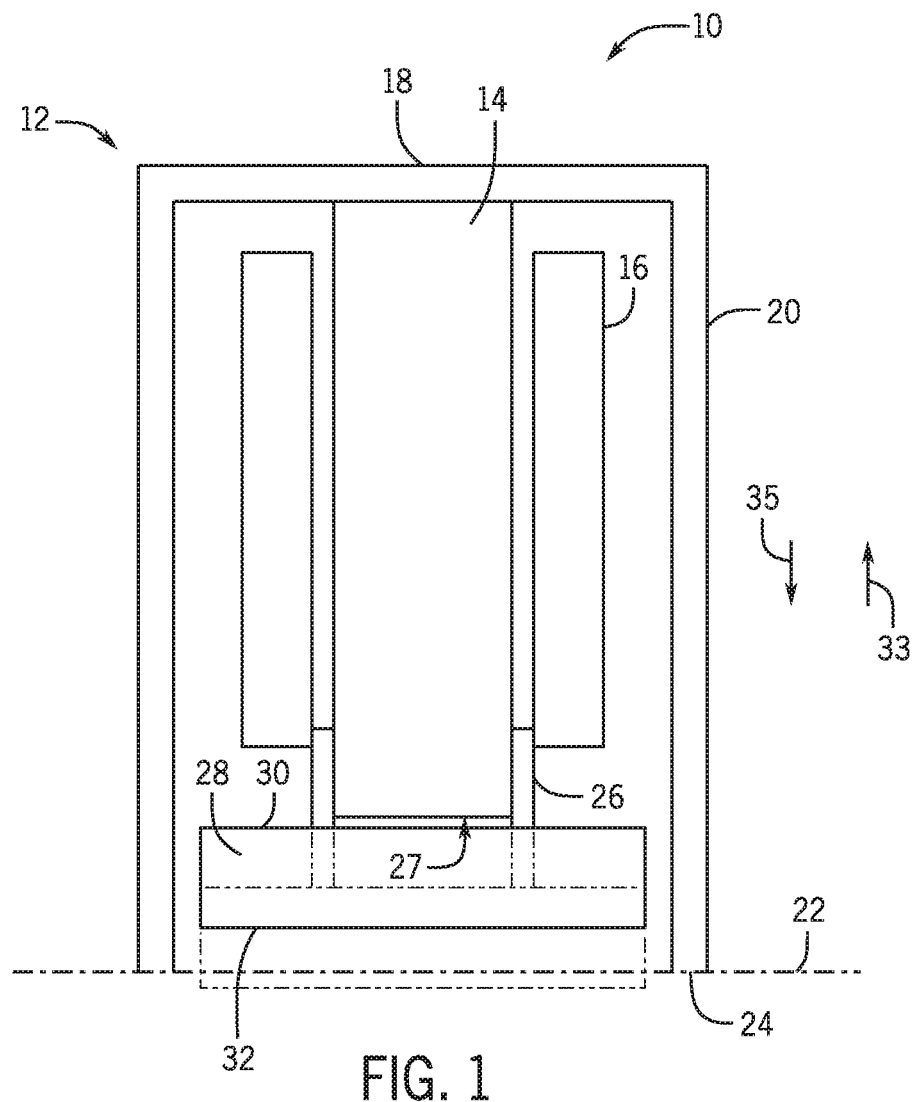
FIG. 1 is a schematic illustration of an electromagnetic actuator in accordance with one embodiment of the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

The use of the phrase "between a first position and a second position" and variations thereof herein does not imply directionality and may include, for example, movement from the first position to the second position and movement from the second position to the first position. Additionally, the phrase "between a first position and a second position" and variations thereof does not imply discreteness and may encompass, for example, movement from the first position to the second position and/or movement from the second position to the first position and all positions therebetween.

FIG. 1 shows an electromagnetic actuator 10 in accordance with one embodiment of the present invention. The electromagnetic actuator 10 can include a housing 12 that at least partially encloses a pole piece 14 and a wire coil 16. The housing 12 can be fabricated from a magnetic material (e.g., a magnetic steel, iron, nickel, etc.) and can define a generally cylindrical shape. In other embodiments, the housing 12 can define a different shape, for example a rectangular shape, as desired. The housing 12 can include a base 18 and a side wall 20 extending from the base 18. As shown in FIG. 1, the side wall 20 can extend substantially perpendicularly from the base 18 to a termination plane 22 where the housing 12 can define a substantially open side 24.

The pole piece 14 can be fabricated from a magnetic material (e.g., a magnetic steel, iron, nickel, etc.) and can define a substantially cylindrical shape. In other embodiments, the pole piece 14 can define a different shape, for example a rectangular shape, as desired. The pole piece 14 can extend from the base 18 of the housing 12. In the illustrated embodiment, the pole piece 14 can be centered within the housing 12. That is, the pole piece 14 can share a common longitudinal axis with the housing 12.

The wire coil 16 can be fabricated, for example, from a copper coil that can be configured to produce a magnetic field, and thereby apply a force, in response to a current being applied to the wire coil 16. The direction and magnitude of the magnetic field, and the force, produced by the wire coil 16 can be determined by the direction and magnitude of the current applied to the wire coil 16. The wire coil 16 can be wrapped around a non-magnetic bobbin (not shown), as would be known by one of skill in the art. The bobbin (not shown) can be dimensioned to fill a space between the pole piece 14, the wire coil 16, and the housing 12 thereby positioning the wire coil 16 around the pole piece 14, as shown in FIG. 1.

A spring 26 can be positioned around a distal end 27 of the pole piece 14. The spring 26 can engage a permanent magnet 28. The spring 26 can be coupled to the pole piece 14, for example via a notch (not shown) protruding from the pole piece 14, such that the spring 26 can expand and compress during actuation of the permanent magnet 28. It should be known that the spring 26 can be coupled to the pole piece 14 via another securing, or attachment, mechanism known in the art. In another embodiment, for example, the spring 26 can be coupled to the bobbin (not shown) instead of the pole piece 14.

Figure 4:
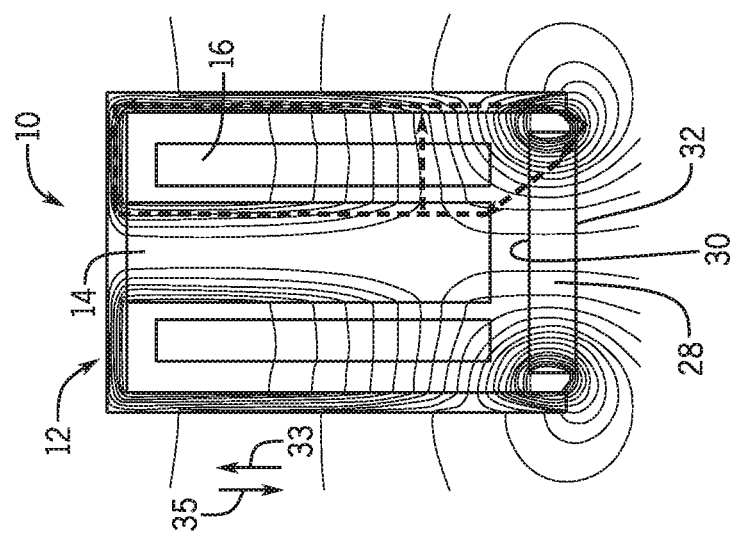
FIG. 4 illustrates a magnetic flux of the electromagnetic actuator of FIG. 1 when a high current is applied to a wire coil of the electromagnetic actuator.
Figure 3:
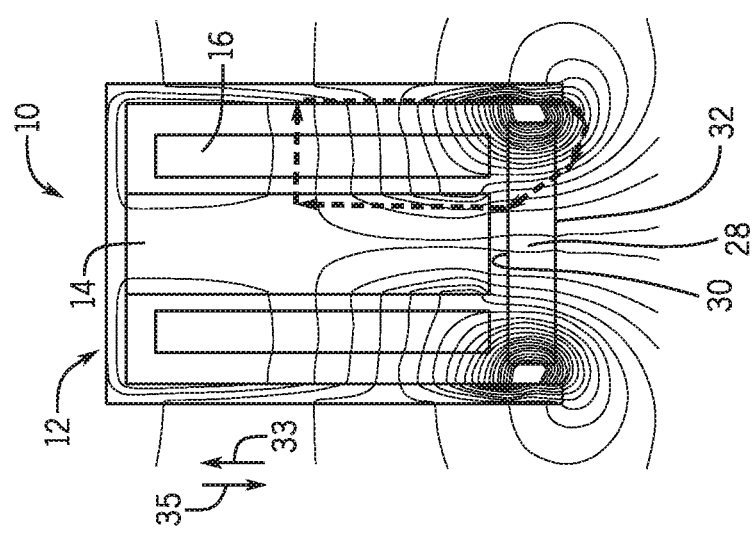
FIG. 3 illustrates a magnetic flux of the electromagnetic actuator of FIG. 1 when an intermediate current is applied to a wire coil of the electromagnetic actuator.
Figure 2:
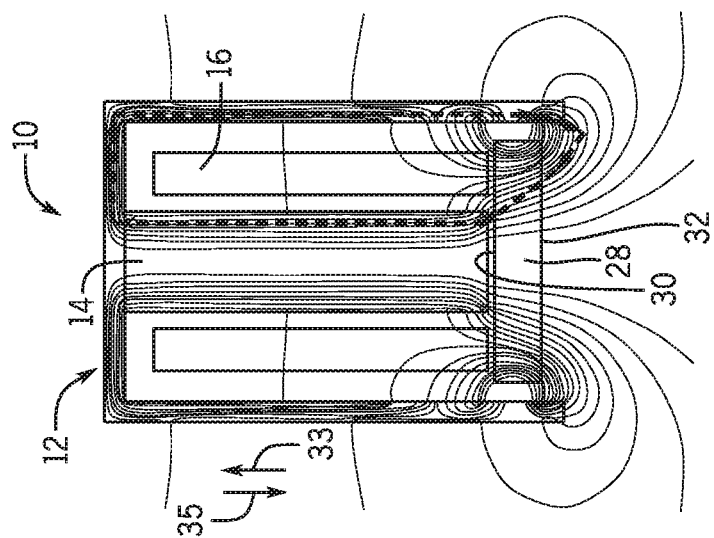
FIG. 2 illustrates a magnetic flux of the electromagnetic actuator of FIG. 1 when no current is applied to a wire coil of the electromagnetic actuator.

As shown in FIGS. 2-4, the permanent magnet 28 and the wire coil 16 can act to induce a varying magnetic flux through the electromagnetic actuator 10 as current is applied to the wire coil 16. When no current is applied to the wire coil 16, as shown in FIG. 2, the permanent magnet 28 can define a magnetic flux path that travels from a first side 30 (i.e., a north pole) of the permanent magnet 28 through the pole piece 14, around the housing 12, and then back to a second side 32 (i.e., a south pole) of the permanent magnet 28. In this operating condition, a force acting on the permanent magnet 28 in an upward direction 33 (i.e., a magnetic attraction between the permanent magnet 28 and the pole piece 14) can be at a maximum. This force acting on the permanent magnet 28 in the upward direction 33 can be balanced by a force of the spring 26 acting on the permanent magnet 28 in a downward direction 35 (i.e., the spring 26 prevents the permanent magnet 28 from magnetically attaching to the pole piece 14).

As current is applied to the wire coil 16, a magnetic field generated by the wire coil 16 can begin to oppose the magnetic flux from the permanent magnet 28, as shown in FIG. 3. At this operating condition, the overall magnetic flux carried through the housing 12 and the pole piece 14 can be reduced by the magnetic field generated by the wire coil 16, which can reduce the force in the upward direction 33 on the permanent magnet 28. This reduced force now acting on the permanent magnet 28, when compared to the force provided by the spring 26, can result in a net output force on the permanent magnet 28 in the downward direction 35 and, as a result, the permanent magnet 28 can move in the downward direction 35 to a new equilibrium position.

As shown in FIG. 4, when the current applied to wire coil 16 is increased to a high level, the magnetic field generated by the wire coil 16 further opposes the magnetic flux from the permanent magnet 28. Additionally, a direction of the magnetic flux carried by the housing 12 can be reversed compared to the magnetic flux carried by the housing 12 when no current is applied to the wire coil 16 (FIG. 2). The increased current further reduces the force on the permanent magnet 28 in the upward direction 33, compared to operating condition of FIG. 2, which, in addition to the force provided by the spring 26, can result in a high net output force on the permanent magnet 28 in the downward direction 35. The net output force in the downward direction 35 on the permanent magnet 28 can enable the electromagnetic actuator 10 to proportionally actuate the permanent magnet 28 between a first position (shown in solid lines in FIG. 1) and a second position (shown in dashed lines in FIG. 1) as current is applied to the wire coil 16. It should be appreciated that, in some non-limiting examples, the electromagnetic actuator 10 may be configured to provide an output force in the upward direction 33.

The changing magnetic flux path described above with reference to FIGS. 2-4, can enable the electromagnetic actuator 10 to experience significantly reduced magnetic flux levels when compared to current electromagnetic actuators (especially those with reduced air gaps). That is, the initial magnetic flux path created by the permanent magnet 28 (FIG. 2) is reversed (FIG. 4) by applying a current to the wire coil 16, which can allow for much lower overall magnetic flux levels. The lower overall magnetic flux levels can prevent magnetic saturation and can enable the electromagnetic actuator 10 to be constructed using smaller, thinner, and/or lighter components (e.g., the housing 12 and the pole piece 14).

As described above, the force acting on the permanent magnet 28 in the upward direction 33 (i.e., a magnetic attraction between the permanent magnet 28 and the pole piece 14) can decrease as current is applied to the wire coil 16. FIG. 5 illustrates a graph of the force acting on the permanent magnet 28 in the upward direction 33 as a function of a position (stroke) of the permanent magnet 28 at varying levels of current applied to the wire coil 16. Specifically, the graph of FIG. 5 includes three lines 34, 36, and 38 each representing the force acting on the permanent magnet 28 in the upward direction 33 when a different current is applied to the wire coil 16. Line 34 can represent no current applied to the wire coil 16, line 36 can represent an intermediate level of current applied to the wire coil 16, and line 38 can represent a high level of current applied to the wire coil 16. The graph of FIG. 5 also includes a line 40 that can represent a force applied by the spring 26 acting on the permanent magnet 28 in the downward direction 35 as a function of the position of the permanent magnet. It should be known that although lines 34, 36, 38 and 40 are all shown as "positive" in FIG. 5, these are absolute values and, in operation, the force applied by the spring 26 opposes the magnetic attraction between the permanent magnet 28 and the pole piece 14.

As shown in FIG. 5, the magnitude of the force acting on the permanent magnet 28 in the upward direction 33 decreases as current is increased across the wire coil 16 (i.e., line 34 is greater in magnitude than line 36 and line 36 is greater in magnitude than line 38). However, in the non-limiting example of FIG. 5, the magnitude of this force can always be "positive" or in the upward direction 33 regardless of the level of current applied to the wire coil 16. The constant "positive" or upward force on the permanent magnet 28 can allow the permanent magnet 28 to automatically return to the first position, once it has been actuated away from the first position, when the current applied to the wire coil 16 is removed. This automatic return of the permanent magnet 28 can negate the electromagnetic actuator 10 from being required to use a double-wound coil and/or from having to reverse the direction of the current applied to the wire coil 16 to return the permanent magnet 28 to the first position.

To counterbalance the "positive" or upward force on the permanent magnet 28, the spring 26 can apply a downward force on the permanent magnet 28 which can decrease as the permanent magnet 28 is proportionally actuated between the first position and the second position. The counterbalancing force applied by the spring 26 can result in a net output force on the permanent magnet 28 in the downward direction 35, and can prevent the electromagnetic actuator 10 from having to overcome an initial attractive force, or "dead" zone, at low currents.

With continued reference to FIG. 5, each of the lines 34, 36, and 38 can define a generally flat, or generally constant, force on the permanent magnet 28 in the upward direction 33 with respect to the position of the permanent magnet 28. The generally flat force profiles defined by lines 34, 36, and 38 can enable the electromagnetic actuator 10 to proportionally actuate the permanent magnet 28 with respect to the current applied to the wire coil 16. That is, an actuation position of the permanent magnet 28 between the first position and the second position can be proportional to a magnitude of the current applied to the wire coil 16.

Figure 6:
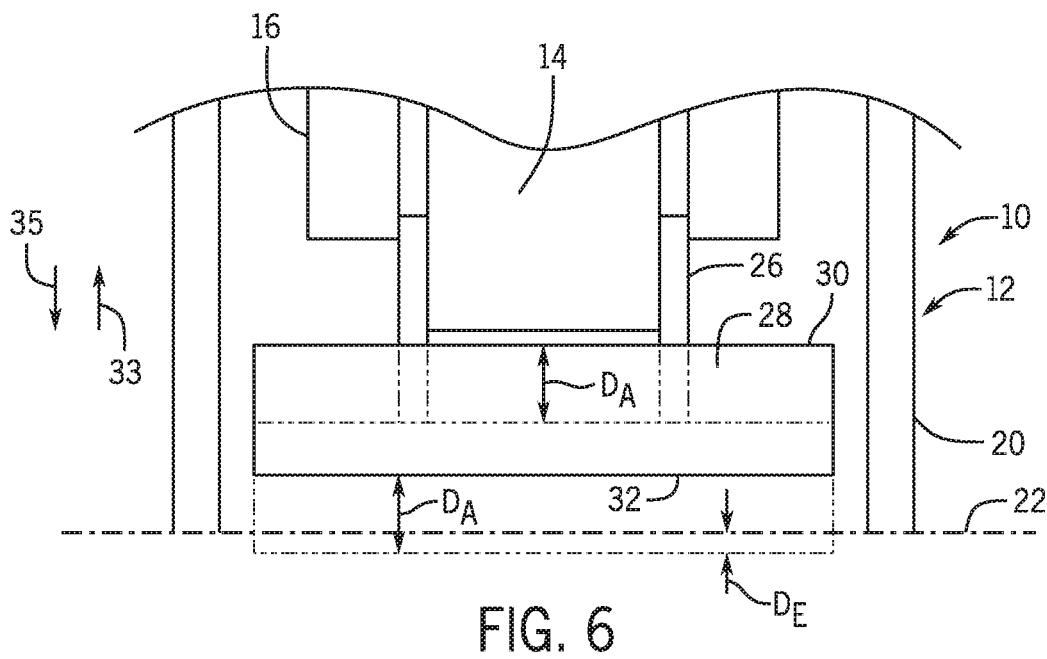
FIG. 6 is a magnified view of a portion of the electromagnetic actuator of FIG. 1 showing one actuation range of the permanent magnet in accordance with one embodiment of the present invention.
Figure 7:
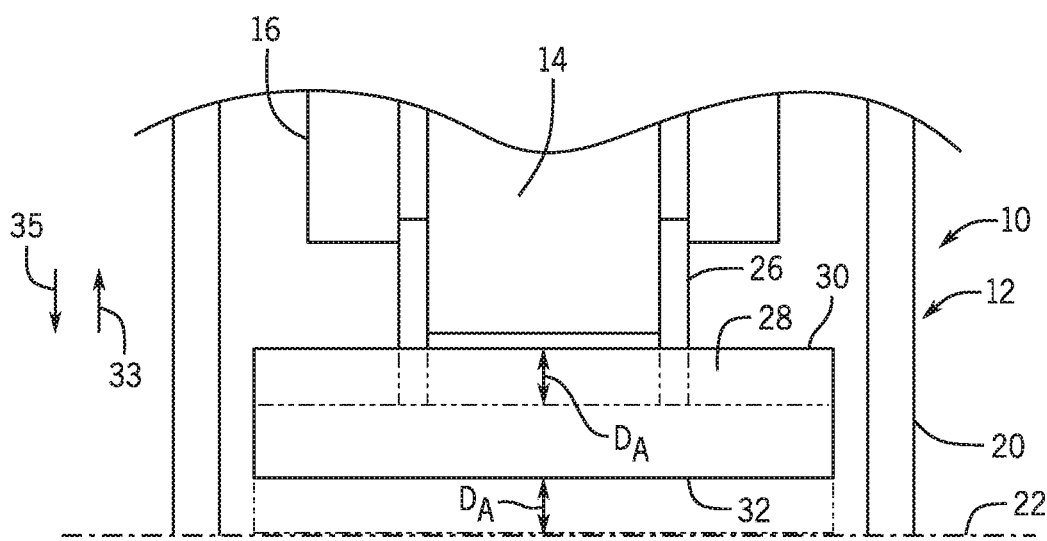
FIG. 7 is a magnified view of a portion of the electromagnetic actuator of FIG. 1 showing another actuation range of the permanent magnet in accordance with another embodiment of the present invention.

Turning to FIGS. 6 and 7, the proportionality in the actuation of the permanent magnet 28 between the first position (solid line) and the second position (dashed lines) of the electromagnetic actuator 10 can be achieved by proper geometric design of the housing 12, as will be described in detail below. When the permanent magnet 28 actuates from the first position to the second position, an actuation range, or stroke, $D_A$ can be defined as a distance the permanent magnet 28 travels between the first and the second positions. In one embodiment shown in FIG. 6, once the permanent magnet 28 reaches the second position, the second side 32 of the permanent magnet 28 can slightly extend beyond the termination plane 22 defined by the housing 12. In another embodiment shown in FIG. 7, once the permanent reaches the second position, the second side 32 of the permanent magnet 28 can be substantially even with the termination plane 22 defined by the housing 12.

An extension distance $D_E$ can be defined as the distance between the second side 32 of the permanent magnet 28 and the termination plane 22 of the housing 12 when the permanent magnet 28 is in the second position. The proportionality between the actuation of the permanent magnet 28 and the current applied to the wire coil 16 can be governed by the geometric relationship between the extension distance $D_E$ and the actuation range $D_A$. In particular, a proportionality ratio $P_R$ can be defined as a ratio of the extension distance $D_E$ to the actuation range $D_A$. The proportionality ratio $P_R$ can range from approximately zero (FIG. 7) to a value approximately greater than zero (FIG. 6). In one embodiment, the proportionality ratio $P_R$ can be between about 0 and 1. In yet another embodiment, the proportionality ratio $P_R$ can be between about 0 and 0.5. In still another embodiment, the proportionality ratio $P_R$ can be between about 0 and 0.2.

Figure 8:
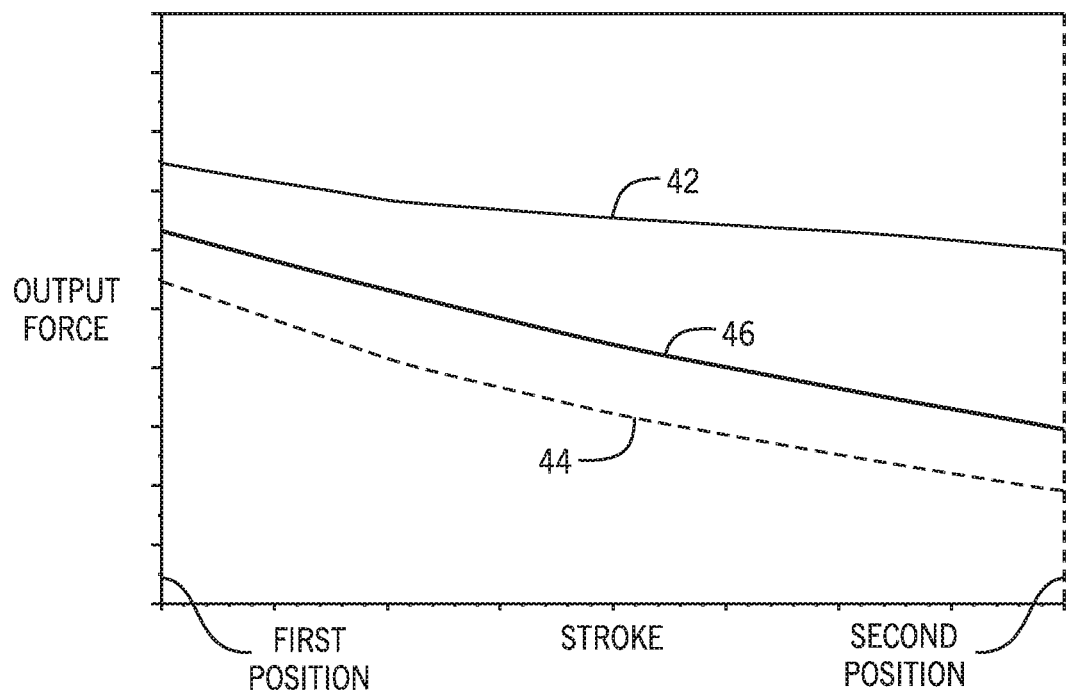
FIG. 8 is a graph illustrating an output force of a permanent magnet of the electromagnetic actuator as a function of a position, or stroke, of the permanent magnet for varying geometries of a housing of the electromagnetic actuator of FIG. 1.

FIG. 8 illustrates the importance of the proportionality ratio $P_R$ with respect to the proportional actuation of the permanent magnet 28. Specifically, FIG. 8 illustrates one non-limiting example of a graph of the output force on the permanent magnet 28 as a function of the position, or stroke, of the permanent magnet 28 for varying proportionality ratios $P_R$. It should be appreciated that for a given position of the second side 32 of the permanent magnet 28 when the permanent magnet 28 is in the second position, the proportional ratio $P_R$ can be varied by altering the position of the termination plane 22 of the housing 12. That is, a length that the side wall 20 extends from the base 18 of the housing 12 can alter the position of the termination plane 22 and thereby the extension distance $D_E$.

Line 42 of FIG. 8 can represent an exemplary embodiment of the output force on the permanent magnet 28 as a function of position of the permanent magnet 28 for the electromagnetic actuator 10 when the proportionality ratio $P_R$ is between about 0 and 1. As shown in FIG. 8, line 42 can define a generally flat force profile with respect to the position of the permanent magnet 28 which, as described above, can enable the electromagnetic actuator 10 to proportionally actuate the permanent magnet 28 in response to the current applied to the wire coil 16. Line 44 of FIG. 8 can represent a relationship between output force and position of the permanent magnet 28 when the termination plane 22 of the housing 12 is substantially parallel to the distal end 27 of the pole piece 14. In this case, the side wall 20 of the housing 12 does not extend a sufficient length and the proportionality ratio $P_R$ can be greater than approximately 1.5. As shown in FIG. 8, line 44 does not define a generally flat force profile and, thus, may not exhibit a proportional relationship between the actuation of the permanent magnet 28 and the current applied to the wire coil 16. Additionally, the magnitude of the output force defined by line 44 is substantially reduced when compared with the exemplary embodiment defined by line 42. Line 46 of FIG. 8 can represent a relationship between output force and position of the permanent magnet when the termination plane 22 is positioned well beyond the permanent magnet 28. In this case, the side wall 20 of the housing 12 extends sufficiently beyond the permanent magnet 28 and the proportionality ratio $P_R$ can be greater than approximately 1.5. As shown in FIG. 8, line 46 does not define a generally flat force profile and, thus, may not exhibit a proportional relationship between the actuation of the permanent magnet 28 and the current applied to the wire coil 16. Additionally, the magnitude of the output force defined by line 46 is substantially reduced when compared with the exemplary embodiment defined by line 42.

It should be appreciated that although lines 44 and 46 of FIG. 8 represent housing designs with similar values of the proportionality ratio $P_R$, they represent different cases of improper housing design. That is, line 44 represents a housing design where the side wall 20 does not extend from the base 18 a sufficient distance to arranged the termination plane 22 in a range that provides proportionality. Conversely, line 46 represents a housing design where the side wall 20 extends too far from the base 18 and arranges the termination plane 22 too far past the permanent magnet 28 to provide proportionality. Thus, both housing designs where the side wall 20 is too short and too long may lead to non-proportionality. However, if the proportionality ratio $P_R$ defined between the housing 12 and the actuation of the permanent magnet 28 is between one of the desired ranges, described above, the electromagnetic actuator 10 can actuate the permanent magnet 28 between the first position and the second position in proportion to a current applied to the wire coil 16 and provide increased output force.

Figure 9:
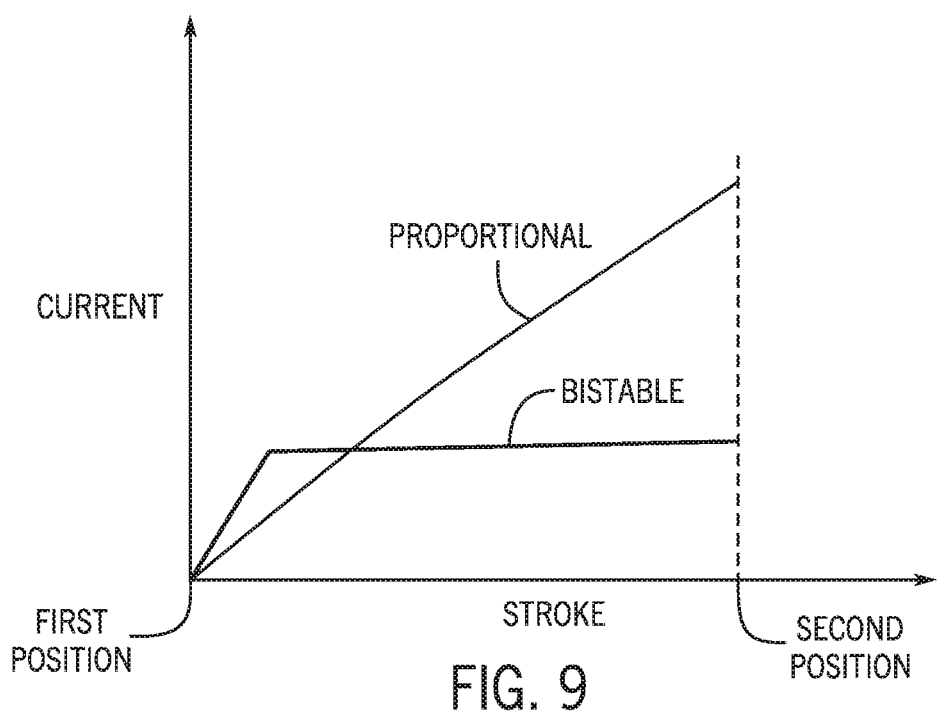
FIG. 9 is a graph illustrating a current applied to a wire coil of the electromagnetic actuator as a function of a position, or stroke, of a permanent magnet of the electromagnetic actuator in accordance with one embodiment of the present invention.

FIG. 9 illustrates one non-limiting example of a relationship between a current applied to the wire coil 16 and the actuation position, or stroke, of the permanent magnet 28. As shown in FIG. 9, for each level of current applied to the wire coil 16 there can be a corresponding position of the permanent magnet 28. Thus, the actuation position of the permanent magnet 28 can be proportional the current applied to the wire coil 16. This can differ from the operation of a bistable, or on-off, actuator. Typically, bistable, or two-position, actuators are only able to operate in one position or another position and not in between. Accordingly, the current vs. position profiles for bistable actuators can plateau once a current applied to the wire coil is sufficient to actuate the armature. Once the sufficient current is reached in bistable actuators, the armature then actuate at a constant current and, therefore, cannot be proportionally actuated.

Exemplary advantages of the above-described electromagnetic actuator 10 or other electromagnetic actuators designed or constructed using the above-identified techniques or properties, will be discussed with reference to the operation of the electromagnetic actuator 10 and FIGS. 1-9. By no means is the following an exhaustive list of the numerous advantages provided by the invention, as will be understood by one of skill in the art.

In operation, the permanent magnet 28 of the electromagnetic actuator 10 can be coupled to a member which is desired to be actuated (e.g., a spool in a valve, or any other system where mechanical movement is desired). The housing 12 can be rigidly secured such that the housing 12 cannot move with respect to the permanent magnet 28. As described above, the permanent magnet 28 can be actuated between the first position and the second position in proportion to an amount of current applied to the wire coil 16. This can enable the electromagnetic actuator 10 to, for example, vary a size of an orifice on a spool in response to an electronic input. In this non-limiting example, when the orifice on the spool needs to close, the current to the wire coil 16 can be reduced to zero and, due to the net positive, or upward, force on the permanent magnet 28 (FIG. 5), the permanent magnet 28 can automatically return to the first position.

The electromagnetic actuator 10 can be constructed using simplified geometries and components that can enable the electromagnetic actuator 10 to be designed using larger air gaps when compared with current electromagnetic actuators. It is well known in the art that air gaps can act like resistors in magnetic circuits and, therefore, due to the relatively large air gaps in the electromagnetic actuator 10, the permanent magnet 28 can experience a significantly reduced side loading (i.e., a force substantially perpendicular to the direction of actuation) when compared with the armatures of current electromagnetic actuators.

The only moving component in the electromagnetic actuator 10 can be the permanent magnet 28 and the spring 26. Contrary to current electromagnetic actuators where an armature typically slides along a surface adjacent to the coil, the permanent magnet 28 can be positioned generally away from the wire coil 16 (i.e., adjacent to the distal end 27 of the pole piece 14) and may not be required to slide along a surface within the electromagnetic actuator 10. This can significantly reduce the sliding friction experience by the electromagnetic actuator 10 when compared with current electromagnetic actuators. Reducing the sliding friction can extend the life-cycle of the electromagnetic actuator 10 compared to current electromagnetic actuators.

Figure 10:
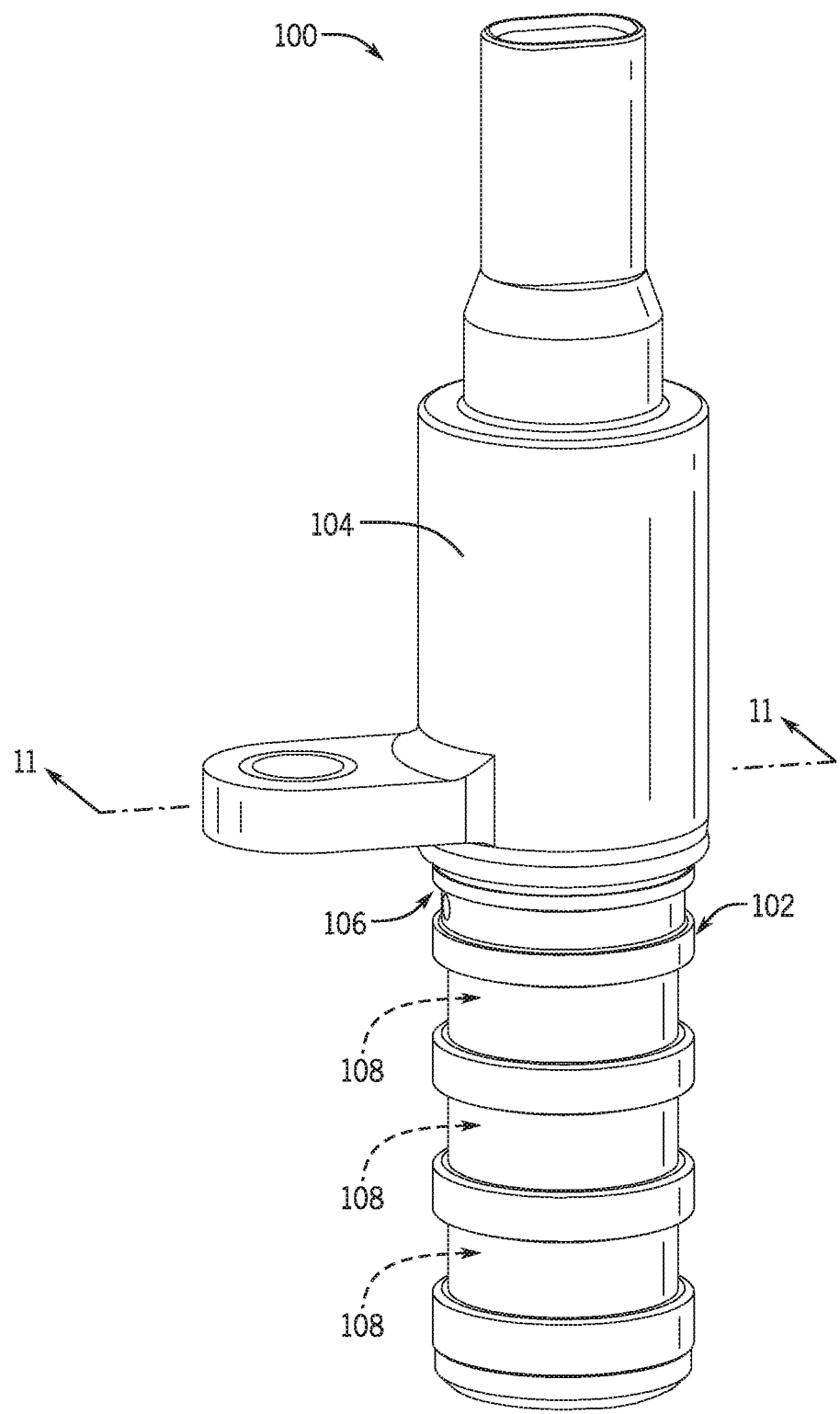
FIG. 10 is a top, front, left isometric view of a control valve in accordance with one embodiment of the present invention.
Figure 11:
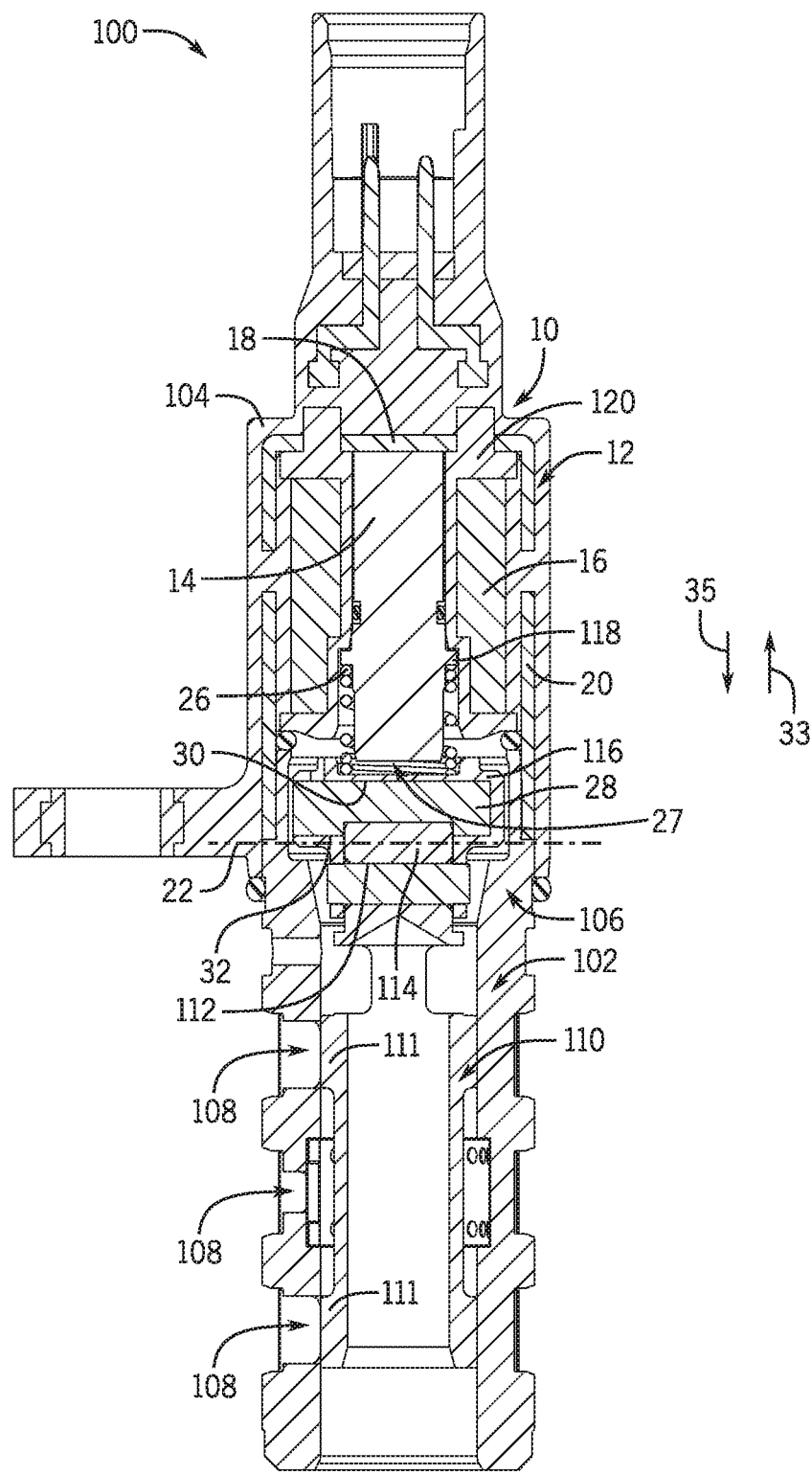
FIG. 11 is a cross-section view of the control valve of FIG. 10 taken along line 10-10.

As described above, in some non-limiting applications, the electromagnetic actuator 10 may be coupled to a spool for actuation thereof. FIG. 10 illustrates one non-limiting example where the electromagnetic actuator 10 is integrated into a control valve 100. As shown in FIGS. 10 and 11, the electromagnetic actuator 10 can be coupled to a valve body 102 of the control valve 100. In the illustrated non-limiting example, an overmold 104 can be overmolded over the housing 12 of the electromagnetic actuator 10 and a top end 106 of the valve body 102. It should be appreciated that overmolding is but one non-limiting coupling mechanism, and other coupling mechanisms (e.g., crimping, interlocking, etc.) may be implemented to couple the electromagnetic actuator 10 and the valve body 102. The valve body 102 includes one or more work ports 108 spaced longitudinally along the valve body 102. A valve spool 110 can be slidably received within the valve body 102 and coupled to the permanent magnet 28 for actuation therewith. The valve spool 110 can include one or more spool notches 111, which can be displaced to selectively provide fluid communication between one or more of the work ports 108. In the illustrated non-limiting example, the permanent magnet 28 can define a coupling recess 112 configured to receive a coupling mechanism 114. The coupling mechanism 114 can couple the permanent magnet 28 to the valve spool 110 to enable the valve spool 110 to actuate with the permanent magnet 28.

The permanent magnet 28 may be at least partially encased by a magnet casing 116. The magnet casing 116 can be fabricated from a non-magnetic material (e.g., plastic, stainless steel, aluminum, carbon fiber, brass, etc.). The magnet casing 116 can facilitate the coupling of the permanent magnet 28 and the valve spool 110. However, it should be appreciated that, in some non-limiting examples, the valve spool 110 may be directly coupled to the permanent magnet 28 and the magnet casing 116 may not be included. As described above, the permanent magnet 28 can be biased in the downward direction 35 by the spring 26. The spring 26 can engage a notch 118 protruding from the pole piece 14. The notch 118 can act as a stop for the spring 26 to facilitate the spring 26 to bias the permanent magnet 28. The wire coil 16 can be at least arranged around a bobbin 120 arranged within the housing 12.

In operation, the electromagnetic actuator 10 can proportionally actuate the permanent magnet 28, and thereby the valve spool 110, between the first position and the second position in response to a current applied to the wire coil 16. This can enable the valve spool 110 to selectively provide fluid communication between one or more of the work ports 108. In addition, the proportionality of the electromagnetic actuator 10 enables the control valve 100 to selectively vary the size of an orifice defined between respective pairs of the work ports 108 and the spool notches 111 by varying an amount of current applied to the wire coil 16. This can enable the electromagnetic actuator 10 to selectively control an amount of fluid flow through or provided by the control valve 100.

It should be appreciated that the structure and design of the control valve 100 is not meant to be limiting in any way. That is, the electromagnetic actuator 10 may be utilized in a variety of applications that require controlled actuation of a component.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. An electromagnetic actuator comprising:
a housing including a base, a side wall extending from the base to a termination plane, and a substantially open side;
a pole piece arranged within the housing;
a wire coil arranged within the housing, wherein the pole piece is arranged within the wire coil;
a permanent magnet moveable between a first position and a second position, and every position between the first position and the second position; and
wherein every position of the permanent magnet between the first position and the second position is proportional to a magnitude of a current applied to the wire coil.

2. The electromagnetic actuator of claim 1, wherein the housing is fabricated from a magnetic material.

3. The electromagnetic actuator of claim 1, wherein the pole piece is fabricated from a magnetic material.

4. The electromagnetic actuator of claim 1, wherein the permanent magnet is coupled to the pole piece by a spring and the spring provides a force on the permanent magnet that opposes an attraction force between the permanent magnet and the pole piece.

5. The electromagnetic actuator of claim 4, wherein the force on the permanent magnet provided by the spring is configured to decrease as the permanent magnet moves from the first position to the second position.

6. The electromagnetic actuator of claim 4, wherein the attraction force between the permanent magnet and the pole piece is configured to decrease as the current applied to the wire coil increases.

7. The electromagnetic actuator of claim 1, wherein the permanent magnet includes a first side and an opposing second side.

8. The electromagnetic actuator of claim 7, wherein when the permanent magnet is in the second position, a ratio of a distance between the second side of the permanent magnet and the termination plane of the housing to an actuation range of the permanent magnet is between about 0 and 1.

9. The electromagnetic actuator of claim 7, wherein when the permanent magnet is in the second position, a ratio of a distance between the second side of the permanent magnet and the termination plane of the housing to an actuation range of the permanent magnet is between about 0 and 0.5.

10. The electromagnetic actuator of claim 7, wherein when the permanent magnet is in the second position, a ratio of a distance between the second side of the permanent magnet and the termination plane of the housing to an actuation range of the permanent magnet is between about 0 and 0.2.

11. A control valve comprising:
an electromagnetic actuator including:
a housing including a base, a side wall extending from the base to a termination plane, and a substantially open side;
a pole piece arranged within the housing;
a wire coil positioned around the pole piece and arranged within the housing;
a permanent magnet coupled to the pole piece by a spring and moveable between a first position and a second position, and every position between the first position and the second position; and
wherein every position of the permanent magnet between the first position and the second position is proportional to a magnitude of a current applied to the wire coil;
a valve body including at least one work port; and
a valve spool slidably received within the valve body and coupled to the permanent magnet for actuation therewith.

12. The control valve of claim 11, wherein the housing is fabricated from a magnetic material.

13. The control valve of claim 11, wherein the pole piece is fabricated from a magnetic material.

14. The control valve of claim 11, wherein the spring provides a force on the permanent magnet that opposes an attraction force between the permanent magnet and the pole piece.

15. The control valve of claim 14, wherein the force on the permanent magnet provided by the spring is configured to decrease as the permanent magnet moves from the first position to the second position.

16. The control valve of claim 14, wherein the attraction force between the permanent magnet and the pole piece is configured to decrease as the current applied to the wire coil increases.

17. The control valve of claim 11, wherein the permanent magnet includes a first side and an opposing second side.

18. The control valve of claim 17, wherein when the permanent magnet is in the second position, a ratio of a distance between the second side of the permanent magnet and the termination plane of the housing to an actuation range of the permanent magnet is between about 0 and 1.

19. The control valve of claim 17, wherein when the permanent magnet is in the second position, a ratio of a distance between the second side of the permanent magnet and the termination plane of the housing to an actuation range of the permanent magnet is between about 0 and 0.5.

20. The control valve of claim 17, wherein when the permanent magnet is in the second position, a ratio of a distance between the second side of the permanent magnet and the termination plane of the housing to an actuation range of the permanent magnet is between about 0 and 0.2.

* * * * *